United States Patent
York et al.

(10) Patent No.: US 6,573,325 B1
(45) Date of Patent: Jun. 3, 2003

(54) AQUEOUS SURFACE TREATMENT COMPOSITIONS

(75) Inventors: David York, 110 Erskine Avenue, Ste. 904, Toronto, Ontario (CA), M4P 1Y4; Jack Currie, 2138 Primate Road, Mississauga, Ontario (CA), L4Y 1V4; Ted Morton, Pictou (CA)

(73) Assignees: David York, Toronto (CA); Jack Currie, Mississauga (CA)

( * ) Notice: Subject to any disclaimer, the term of this patent is extended or adjusted under 35 U.S.C. 154(b) by 0 days.

(21) Appl. No.: 09/560,573

(22) Filed: Apr. 28, 2000

(51) Int. Cl.$^7$ .................................................. C08J 3/02
(52) U.S. Cl. ...................... 524/501; 524/186; 524/503; 526/271; 526/332
(58) Field of Search ................. 524/186, 501, 524/503; 526/271, 332

(56) References Cited

U.S. PATENT DOCUMENTS

| | | | |
|---|---|---|---|
| 3,878,151 A | * | 4/1975 | Dachs et al. ............... 260/29.6 |
| 4,094,841 A | | 6/1978 | Mani |
| 4,138,381 A | | 2/1979 | Chang et al. |
| 4,169,818 A | | 10/1979 | DeMartino |
| 4,384,096 A | | 5/1983 | Sonnabend |
| 5,015,711 A | | 5/1991 | Simonet et al. |
| 5,254,636 A | * | 10/1993 | Kwak et al. ............... 525/369 |
| 5,521,256 A | | 5/1996 | Kwak et al. |
| 5,539,039 A | | 7/1996 | Kwak et al. |
| 5,814,374 A | | 9/1998 | Nkansah et al. |
| 5,874,495 A | | 2/1999 | Robinson |

FOREIGN PATENT DOCUMENTS

| | | |
|---|---|---|
| EP | 0 011 806 A | 6/1980 |
| EP | 0 011 806 * | 6/1980 |

OTHER PUBLICATIONS

All Purpose Building Materials and John E. Goudey Manufacturing Ltd., Technical Offering, Feb. 14, 1997.
ISP Industrial Reference Guide, <<www.ispcorp.com/products/industrial/ind_ref.html>>.
ISP Brochure entitled "Specialty Products for Personal Care", author unknown, undated.
The International Searching Authority, "Invitation to Pay Additional Fees" (Form PCT/ISA/206), mailed Nov. 30, 2001, 5 pages, in connection with International Application No. PCT/CA 01/00568, filed Apr. 26, 2001.

* cited by examiner

Primary Examiner—David W. Wu
Assistant Examiner—William Cheung
(74) Attorney, Agent, or Firm—Katten Muchin Zavis Rosenman

(57) ABSTRACT

An aqueous surface treatment composition, methods for the production thereof, and an apparatus for the preparation of aqueous surface treatment compositions. The composition comprises a water soluble thickening polymeric thickening agent, water and a basic neutralizing agent. Additionally, coloring agents and polyols may be added to the composition. The polymeric water soluble thickening agent and basic neutralizing agent are present in sufficient quantity to afford a viscous composition that, upon application to a suitable surface, provide a surface treatment. The apparatus useful for the production of aqueous surface treatment compositions simultaneously and rapidly mixes and dispenses a fast forming viscous compositions.

33 Claims, 5 Drawing Sheets

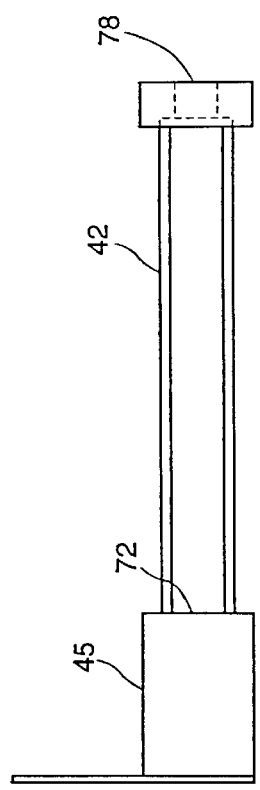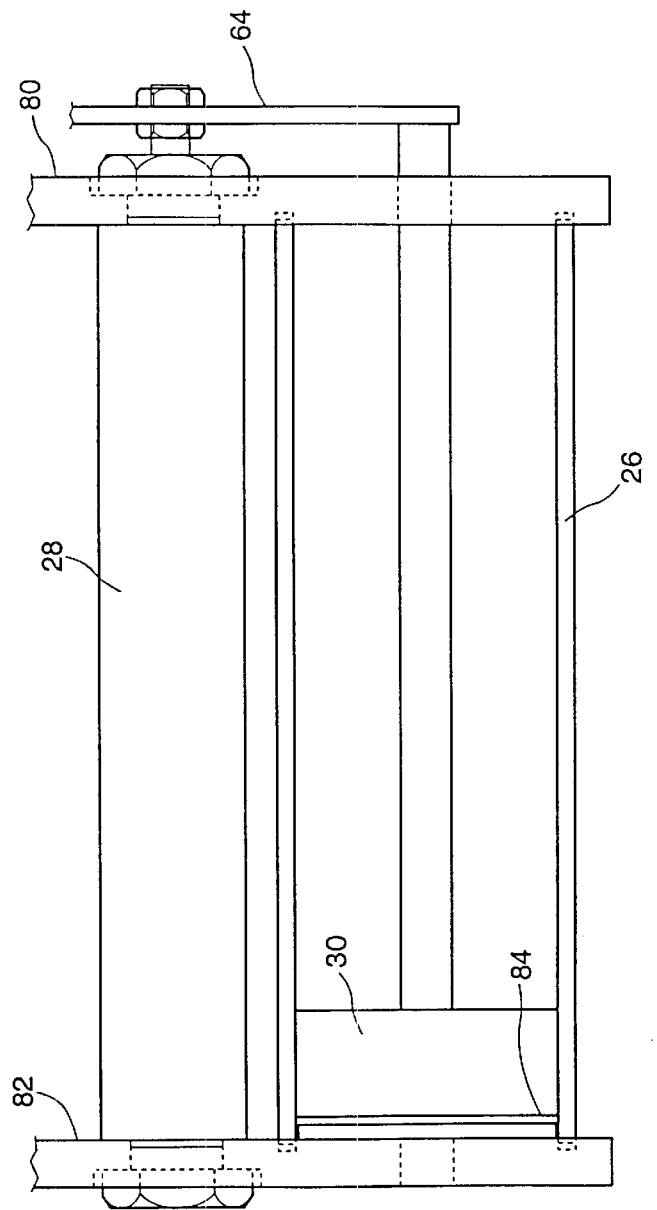

AQUEOUS SURFACE TREATMENT COMPOSITIONS

FIELD OF THE INVENTION

The present invention relates to aqueous surface treatment compositions, their preparation and their use.

BACKGROUND OF THE INVENTION

The concept of using aqueous compositions for coating purposes has been known for several years. Moreover, the drive towards more environmentally friendly coatings containing low to zero amounts of volatile organic components (also referred to as V.O.C.'s) has added momentum to the development of water based coatings over traditional solvent based coatings.

Technical advances in the field of emulsion formulations have formed a basis for the commercial development of the commercial aqueous coating field that includes, for example, paints, stains and topcoat coatings. A ubiquitous aqueous coating composition is acrylic latex paint. Aqueous coatings based upon water-borne or emulsion formulations, are those whereby a polymeric resin (also referred to as a binder), pigments, and other additives are added to water with stirring until phase inversion occurs. High shear speeds and elevated temperatures are sometimes employed in order to achieve aqueous emulsion-based coatings. As well, emulsion-based aqueous coatings can be prepared by addition of one or more water-miscible solvents followed by stripping to remove the solvent from the final coating composition.

Polymeric resins in coatings act as binders to bind the pigment particles into uniform coatings and make the coatings adhere to the surface to which they are applied. They may also act as water-soluble thickening agents to provide thickening effects to the coatings. Other conventional aqueous coatings composition additives include, for example, emulsifiers, thickeners, humectants, curing agents, biocides, germicides, plasticizers, fillers and extenders.

If a film-forming coating is desired, coalescents can be added to aqueous coating compositions to temporarily lower the minimum film forming temperature, commonly referred to as the "MFFT" of a polymeric resin, allowing the coating composition to form a continuous film at a lower temperature than its $T_g$. The $T_g$, or glass transition temperature, of a polymer is a measure of the hardness and melt flow of the polymer. The higher the $T_g$, the less the melt flow and the harder the coating. $T_g$ generally defines the onset of long range molecular motion wherein the polymer preserves the outward appearance of a solid but becomes rubbery and then tacky with increasing temperature and undergoes plastic flow and elastic deformation.

If a film-forming coating is desired, a polymer having a glass transition temperature at or near room temperature can be utilizied in the coating composition. In other instances, non-film forming aqueous coating compositions are desirous. For example, U.S. Pat. No. 4,094,841 teaches the use of a non-film forming latex coating prepared by emulsion polymerization for use with paper coatings and opacifying agents.

Despite their acceptance, current emulsion-based technologies used for the preparation of aqueous coatings have several drawbacks. Stability of emulsion-based aqueous coatings can be problematic and emulsion processes typically require surface-active agents, referred to as surfactants, to help stabilize the emulsions over long periods of time and a wide range of temperatures. Surfactants are also employed to inhibit foaming and to help disperse the pigments, or combinations thereof Conventional types of surfactants include anionic surfactants, non-ionic surfactants, cationic surfactants, amphoteric surfactants, or combinations thereof.

In aqueous coatings compositions, the rheology of the coating must be controlled in order to obtain proper flow of the surface treatment with a minimum of dripping or spattering. There are many types of thickeners, including polymeric water-soluble thickening agents, that may be added to emulsion based coatings to obtain a desired rheology. Thickeners such as cellulose ethers, alkali soluble latex copolymers, copolymers of acrylic and methacrylic acids and esters which have a portion of the hydrogen ions of the copolymer carboxyl group replaced with ammonium or alkali metals ions have been used as thickeners. Examples of thickeners are described in the patent literature, including U.S. Pat. No. 4,384,096 which discloses a pH responsive thickener comprising an ethylenically unsaturated carboxylic acid, at least one ethylenically unsaturated monomer and an ethylenically unsaturated surfactant copolymerizable therewith. Similar systems are disclosed in U.S. Pat. Nos. 5,874,495 and 4,138,381.

Another drawback of the current emulsion-based aqueous coating compositions is the detrimental effects of aqueous coating compositions on substrates that are of a porous or cellulose nature such as wood fibres. Grain raising, lap marks, distension and distortion may result after an emulsion-based aqueous coating composition has been applied due to the water-borne nature of the coatings.

Finally, the appearance of emulsion-based aqueous surface treatments can be a drawback. Emulsion-based aqueous coating compositions often retain an aesthetically undesirable turbid characteristic.

In order to compete with more conventional solvent-based coating systems, the aesthetic and physical properties of aqueous based coatings must be comparable. Alternative coating systems and compositions, and methods and apparatus for creating such systems and compositions are desirable.

BRIEF SUMMARY OF THE INVENTION

In a first aspect of the present invention what is provided is an aqueous surface treatment composition comprising a polymeric water soluble thickening agent, water, and one or more than one basic neutralizing agents, wherein the percentages of components of said composition are selected in such a way that a viscous surface treatment composition is formed.

In accordance with a preferred embodiment of the invention, the aqueous surface treatment composition further comprises one or more than one colouring agent, or one or more than one polyol, or combinations thereof.

In accordance with yet another preferred embodiment of the invention, the polymeric water-soluble thickening agent has a $T_g$ greater than 30° C.

In accordance with yet another preferred embodiment of the invention the polymeric water soluble thickening agent comprises a crosslinked alkyl vinyl ether/maleic anhydride copolymer and the aqueous surface treatment composition is prepared, in part, by hydrolysis of the anhydride groups of the copolymer to the corresponding carboxylic acid groups, followed by neutralization using a basic neutralizing agent.

In accordance with yet another preferred embodiment of the invention, the aqueous surface treatment composition can be non-film forming upon application to a suitable substrate or film forming upon application to a suitable surface.

In accordance with yet another preferred embodiment of the invention, the aqueous surface treatment composition further comprises a polyol present at sufficient wt % such that, upon application of the surface treatment to a suitable surface, the surface treatment possesses a re-wettable edge.

In a second aspect of the present invention there is provided a method of providing a temporary surface treatment on a substrate comprising applying the surface treatment composition of the present invention to a substrate and allowing the composition to dry. As such, the surface treatment is subsequently removable upon application of water to the composition. Drying may take place under ambient temperatures or with the use of radiant heat.

In accordance with yet another preferred embodiment of the present invention, there is provided a method of providing a permanent surface treatment on a substrate by applying the surface treatment composition of the present invention to a substrate and allowing the composition to dry; followed by application of a sealant coating over the dried composition of the present invention. The sealant is allowed to dry to form a protective coating over the surface treatment composition. Drying may take place under ambient temperatures or with the use of radiant heat.

In a third aspect of the present invention there is provided a process for the preparation of an aqueous surface treatment composition, comprising the steps of adding a polymeric water soluble thickening agent to water, agitating the water and thickening agent solution until the polymeric agent is dispersed in the water and hydrolysed, and adding a basic neutralizing agent in sufficient quantity such that a viscous surface treatment composition is formed.

In accordance with another preferred embodiment of the invention, there is provided a process for the preparation of an aqueous surface treatment composition comprising the steps of preparing a first solution comprising water and a polymeric water soluble thickening agent; preparing a second solution comprising water and one or more than one basic neutralizing agents; and combining and mixing the solutions such that a viscous surface treatment composition is formed.

In accordance with yet another preferred embodiment of the invention, the second solution further comprises one or more than one colouring agent, or one or more than one polyol, or combinations thereof In accordance with yet another preferred embodiment of the invention the first solution is acidic in pH and the second solution is basic in pH.

In accordance with yet another preferred embodiment of the invention, the water soluble thickening agent in the first solution is hydrolysed, and the hydrolysed solution is cooled to about 20° C. to 60° C., prior to mixing with the second solution.

In accordance with yet another preferred embodiment, the final surface treatment composition has a pH between 6 and 8. In accordance with yet another preferred embodiment, the final surface treatment composition has a pH of 7.

In a fourth aspect of the present invention there is provided an apparatus for the preparation and dispensing of composition including aqueous surface treatment compositions, comprising a plurality of mixing chambers for containing components of an aqueous surface treatment composition, each chamber having an outlet for passage of components of the composition from the mixing chamber; at least one mixing apparatus operatively connected to the mixing chambers so as to permit mixing of the components of the composition in the mixing chambers; a plurality of pumping chambers, each defining an inner volume, and each having at least one inlet to allow for passage of the components to the pumping chamber, and at least one outlet to allow for passage of components from the pumping chamber; a passageway extending from each of the mixing chambers to each of the pumping chambers for passage of the components of the surface treatment composition therethrough; a plurality of plungers, one plunger mounted in each of the pumping chambers, and each of the plungers being reciprocally movable toward and from the pumping chamber outlet, each of the plungers including a first portion sized to extend sealingly through the pumping chamber and permitting flow of the components outwardly through the outlets of the pumping chambers; a mixer assembly in fluid communication with the pumping chambers, and including mixing means for mixing the components of the aqueous surface treatment composition, and an outlet for passage of the mixed components from the mixer assembly; and wherein the components of the surface treatment composition are simultaneously mixed and dispensed.

In accordance with another preferred embodiment, the apparatus further comprises at least one heating apparatus contained within at least one of the mixing chambers for regulation of temperature of the components of the compositions.

In accordance with yet another preferred embodiment of the invention, the apparatus further comprises a drive mechanism operatively connected to the plungers to reciprocally drive the plungers movably through the pumping chambers. The internal volume of the pumping chambers are filled with the components of the surface treatment composition by force of suction by way of movement of the plungers away from the outlets of the pumping chambers, and the components of the surface treatment composition are displaced outwardly from the pumping chambers by force of the plungers towards the outlets of the pumping chambers. The drive mechanism can control the distance the plungers move through the pumping chambers thereby controlling the amount of components permitted to flow outwardly through the outlets of the pumping chambers to the mixer assembly.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIG. 7 is a partial front view of the pumping system of FIG. 1, showing the pneumatic actuator and only one cylinder and piston assembly;

FIG. 8 is a side view of the dispensing head and static mixer assembly of the apparatus of FIG. 1, showing discharge valves for passage of both solutions into the static mixer assembly.

DETAILED DESCRIPTION OF THE PREFERRED EMBODIMENTS

Figure 1:
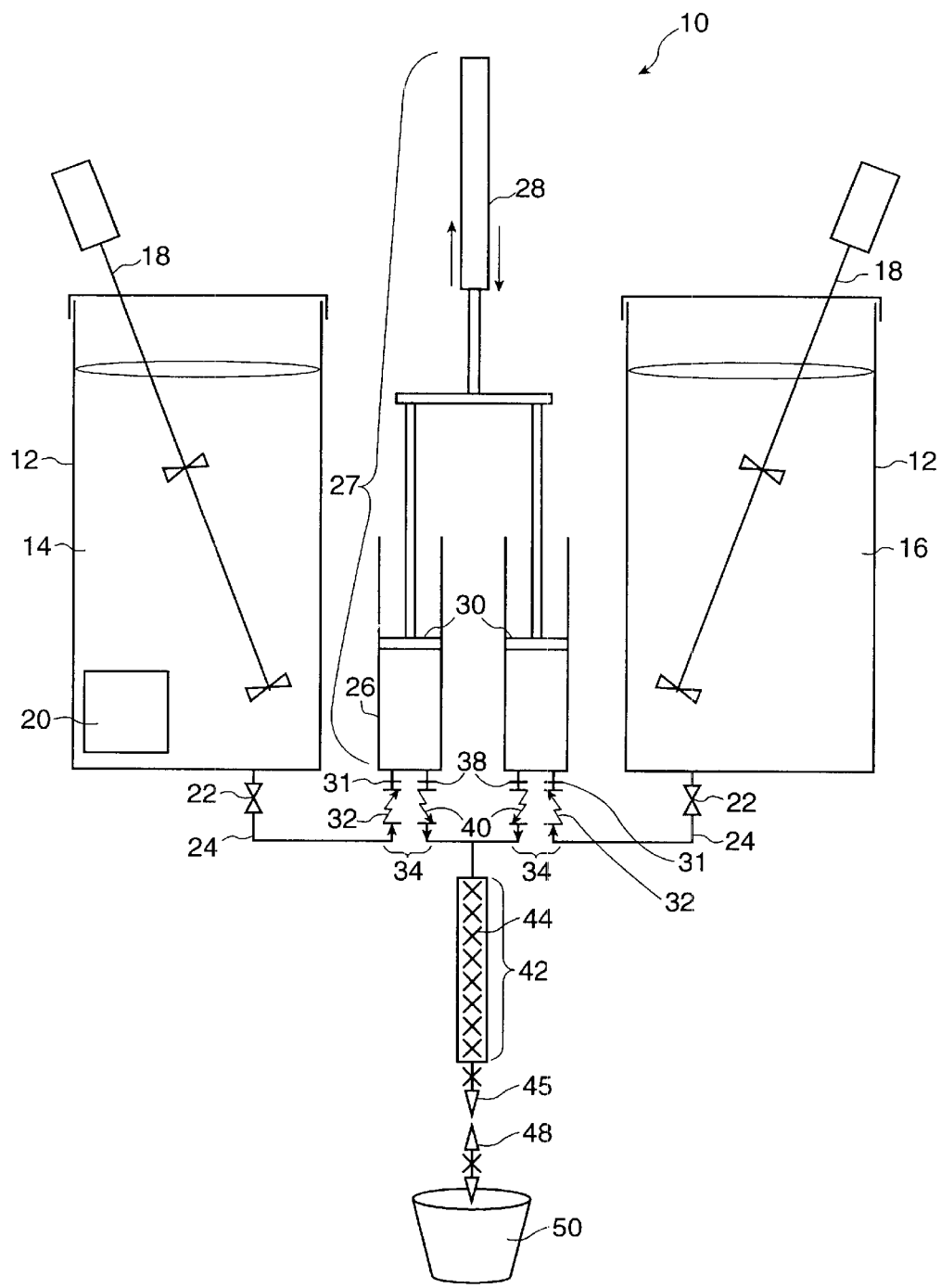
FIG. 1 is a schematic representation of an aqueous surface treatment preparation and dispensing apparatus according to a preferred embodiment of the present invention.

The description that follows, and the embodiments therein, are provided by way of illustration of an example, or examples or particular embodiments of the principles of the present invention. These examples are provided for the purpose of explanation, and not limitation, of those principles and of the invention. These examples include a description of the best mode of practising the invention currently known to the inventors.

As used in this specification, the following terms have the following definitions, unless the context clearly indicates otherwise. By low to zero V.O.C. as used herein means that the surface treatment composition does not contain "volatile organic compounds" defined herein as any organic compound which participates in photochemical reactions; that is any organic compound other than the following which have been excluded because of their negligible photochemical reactivity: methane, ethane, methyl chloroform, acetone, methylene chloride, CFC-113, CFC-114, CFC-115, CFC-11, CFC-22, FC-23, HF-123, HCFC-141b, HCFC-142b, and HFC-134a. This is not to be taken as excluding composition which contain very low levels of deliberately or adventitiously added V.O.C.'s such as, for example, V.O.C.'s formed during polymerization of the polymeric water soluble thickening agent, or V.O.C. impurities contained within colouring agents, basic neutralizing agents, polyols, or any other additives. The term "colouring agent" as used herein refers to natural or synthetic, inorganic or organic, soluble or insoluble additives which, when added to liquid vehicle, may provide, in addition to colour, additional properties of the composition such as, for example, opacity, hardness, durability. The term includes dispersions and pigments.

The aqueous surface treatment composition of the present invention provides an aqueous surface treatment composition comprising a polymeric water-soluble thickening agent, water and one or more basic neutralizing agents. The relative amounts of each component can vary over various ranges, with an effective range of about up to 1% by weight polymeric water soluble thickening agent, and a varying range of percent weight of basic neutralizing agent, depending on its alkalinity. Weight percentages are relative to the total composition. It is also understood that additional additives may be added to the aqueous surface treatment composition of the present invention.

Polymeric water soluble thickening agents used in this invention are those capable of forming a uniform surface treatment that can bind to a suitable surface at ambient temperatures. In a preferred embodiment, the polymeric water soluble thickening agent comprises a crosslinked lower alkyl vinyl ether and maleic anhydride copolymer as described in U.S. Pat. No. 5,539,039, and commercially available under the trademark "STABILEZE" from ISP (Canada) Inc. When present in quantities up to 1 weight percent in the composition, preferably 0.5 weight percent in a preferred embodiment, the composition is a thixotropic composition. In the preferred embodiment, the composition does not require addition of an additional thickener component to the composition and the thixotropic composition is capable of suspending particulates, including colouring agents such as pigments. As such, the polymeric thickening agent of the present embodiment acts as both a binder for colouring agents and a thickener in the surface treatment composition.

The viscous nature of the surface treatment composition is achieved by addition of a basic neutralizing agent to raise the pH of the composition to a neutral or basic pH value, i.e., 7 or above. In a preferred embodiment, the pH is 7. By raising the pH to 7 or above, all of the carboxyl groups of the polymeric agent of the preferred embodiment are maintained in an ionized state. Potentially useful basic neutralizing agents include, for example: ammonia, primary monoamines such as ethylamine and propylamine; alkali metal hydroxides, such as sodium hydroxide; alkyl amines such as N-methylmorpholine and ethylenediamine. This list is illustrative and not complete.

In a preferred embodiment, the basic neutralizing agent comprises triethanolamine at 0.29% by weight of the total composition. In another preferred embodiment, triethanolamine is present at 1.28% by weight. In another preferred embodiment, triethanolamine is present at 0.1% by weight. In yet another preferred embodiment, the basic neutralizing agent comprises sodium hydroxide at 0.1% by weight of the total composition. In yet another preferred embodiment, sodium hydroxide is present at 0.2% by weight.

In a preferred embodiment, the surface treatment composition is formulated to be modestly film forming upon application to a suitable substrate. In another preferred embodiment, the surface treatment composition is formulated to be non-film forming upon application to a suitable substrate. In a preferred embodiment, sodium hydroxide is used as the basic neutralizing agent in the film forming composition. In another preferred embodiment, triethanolamine is used as the basic neutralizing agent in the non-film forming composition.

In another preferred embodiment, colouring agents are added to the aqueous coating composition of the present invention. Potentially useful colouring agents include, but are not limited to, finely ground, natural or synthetic, inorganic or organic, insoluble or dispersed colourants, synthetic pearls and metallics, organic dyes, inorganic dyes, water soluble dyes, universal colorants. Tint dispersions prepared separately can be added if they are compatible with the basic neutralizing agent. Use of some colouring agents, such as aluminum or metal alloys as colouring agents, may require pretreating prior to addition to the treatment composition mixtures. Colouring agents can cause a change in the pH of the mixture to which they are added. Therefore, the quantity of basic neutralizing agent added to surface treatment compositions can vary depending upon the type and acidity or bacisity of the colouring agent added.

Addition of colouring agents provide a wide colour range and aesthetic quality of surface treatment compositions such as three-dimensional appearance, and can render the surface treatment transparent or translucent. In a preferred embodiment, three colouring agents, Aquasperse™ brown, red oxide and black (available from Hüls America Inc.) are added in 4.86, 1.36 and 0.68 percent by weight of the total composition, respectively to the aqueous surface treatment composition. In another preferred embodiment, Aquasperse™ white is added in 6.39 percent by weight of the total composition.

In another preferred embodiment of the surface treatment composition of the present invention, one or more polyols are added to the surface treatment composition comprising up to 50 percent by weight of the total composition, the addition of which affords a surface treatment composition with a re-wettable edge upon application to a suitable surface. Addition of a polyol can increase workability time of the surface treatment and can also provide for the use of water insoluble colouring agents in the aqueous surface treatment composition of the present invention, by grinding the insoluble colouring agents into the polyol prior to addition to water. In a preferred embodiment, the polyol is propylene glycol. In a preferred embodiment, propylene glycol is present at 20.87 weight percent of the total surface treatment composition. In another embodiment, propylene glycol is present at 24.16 percent by weight of the total composition. Other potentially useful polyols include, for example alkylene glycols, such as ethylene glycol, butylene glycol, and 1,4-butanediol; aliphatic polyetherdiols, such as linear or branched poly(oxyethylene) glycols, poly (oxypropylene) glycols and/or poly(oxybutylene) glycols, and mixed polyetherdiols, such as poly (oxyethyleneoxypropylene) glycols; aromatic or alkylaromatic diols, for example 2-alkyl-2-phenylpropane-1,3-diol, bisphenol derivatives; polyols having at least 3 hydroxy groups such as trimethylolpropane, trimethylolethane, and glycerol. This list is illustrative and not complete.

The aqueous surface treatment coating composition can be formulated to contain zero V.O.C's, low quantities of V.O.C.'s, or high quantities of V.O.C.'s. In one preferred embodiment, propylene glycol is added to an aqueous surface composition comprising water, STABILEZE™, and sodium hydroxide to afford a zero V.O.C. surface treatment composition.

There are a number of ways to prepare the aqueous surface treatment compositions of the present invention. In one embodiment, the polymeric water soluble thickening agent is added to water, in quantities up to 1% by weight of the total composition and stirred for several hours until a translucent liquid develops, thus indicating that the polymeric water soluble thickening agent is dissolved in the water. The pH of the solution is acidic, typically pH 2.5. In another preferred embodiment, the water is heated, preferably to 80° C., prior to addition of the polymeric agent, followed by constant stirring. A basic neutralizing agent is added in sufficient quantity to raise the pH of the composition to substantially neutral in this embodiment in order to produce a viscous composition. Regulation of the pH can be used as a means to control the thickening of the composition.

In another embodiment for preparation of the aqueous coating composition, the aqueous surface treatment composition is prepared by preparation of two separate solutions, which, upon combination, yield the surface treatment composition. This embodiment is preferred for large-scale preparation of aqueous surface treatment compositions. One solution comprises a polymeric thickening agent and water, and the other comprises water, a basic neutralizing agent and other additives, including, for example, a colouring agent(s) and a polyol(s). Upon combination, the two solutions form the aqueous coating composition. The first solution, upon addition of the polymeric agent, in a preferred embodiment, is heated to 80° C. and stirred until a translucent liquid develops. The mixture is cooled. The first solution is acidic in pH. The second solution is prepared by addition of a basic neutralizing agent to water, and, for example, a polyol and/or colorant, and other additives. The solution is basic in pH. Quantities of the first solution and the second solution, preferably equal volumetric amounts, are added together, and preferably agitated to produce the desired aqueous surface treatment composition. The composition preferably has a pH of 7. In other embodiments, the pH is between 6 and 8.

The surface treatment compositions of this invention may be applied to a suitable substrate by methods well known in the art of applying surface treatment compositions. Potential methods for applying the composition include, for example, air-assisted spray, airless spray, brush (including foam and bristle), roller, and rag. This list is illustrative and not complete.

Once applied to the substrate, the surface treatment compositions are typically cured at ambient temperatures, or in some cases at elevated temperatures. The amount of composition applied is not particularly restricted but in a preferred embodiment, it is generally in the range of about 25 microns in terms of surface treatment thickness as dried when the composition is non-film forming. The surface treatment thickness may be higher or lower in other examples. Upon application to a suitable substrate the water and base evaporate to leave a surface treatment. The hydrolysed polymeric agent and pigment revert to a surface treatment with sufficient tack to form a surface treatment. The nature of the gel ensures that the water evaporates outward toward the air and is not absorbed into the substrate.

The present composition can be used for surface treatment of a broad range of surfaces, such as, for example, wood, reconstituted wood, plastics, paper, cementatious substrates and previously primed or coated substrates. Preferred substrates are indoor architectural substrates such as walls, ceilings and floors.

The surface treatment composition of the present invention can be used on bare or sanded wood or latex paint surfaces. It does not necessitate the use of conditioners, pre-stains or sanding sealers. As well, flexibility in formulations of the surface treatment composition of the present invention affords a broad range of formulations. Preferred embodiments include use of the surface treatment composition as decorative glazes, softwood conditioners, faux finishes (surface treatments which can be created by combining several layers of transparent and translucent coatings together to achieve an impression of faux depth or age), wood stains, and printing inks. This list of uses is illustrative and not complete.

The aqueous surface treatment composition of the present embodiment, upon application to a suitable surface and drying, can be removed at any time with a damp sponge or other similar applicator, unless it has been sealed to the surface. This property is particularly useful in uses such on walls in apartment dwellings where removable surface treatments are highly desirable.

Sealants compatible with the aqueous surface treatment composition of the present invention may include but are not limited to oil-modified urethanes, some waterborne sealers and nitrocellulose and catalyzed laquers, and acrylic laquers in aliphatic solvents. In the preferred embodiment, an aliphatic solvent solution of methacrylate esters is used as a sealant surface treatment for the aqueous surface treatment composition.

The speed at which gelation of the aqueous surface treatment composition takes place does not lend itself to the use of conventional mixing apparatus for the preparation of the aqueous surface treatment composition. This is particularly true for large-scale preparation of the aqueous surface treatment composition. The use of traditional horizontal Z-blade mixers to mix the aqueous surface treatment composition is problematic to adopt in light of the subsequent steps of decanting and dispensing the surface treatments into containers for storage and transport. What is required is an apparatus that can simultaneously and rapidly mix and dispense the aqueous surface treatment.

With reference to FIG. 1, apparatus 10 is used for preparation of the aqueous surface treatment composition of the present invention and includes, in this embodiment, two tanks 12 for the mixing, respectively, of a first solution 14 and a second solution 16. The first solution 14, in this instance, comprises a polymeric water-soluble thickening agent and water. The pH of solution 14 is acidic. In this embodiment, polymeric water-soluble thickening agent comprises a crosslinked alkyl vinyl ether/maleic anhydride copolymer. Second solution 16, in this instance comprises a basic neutralizing agent, water and colouring agent. The pH of this solution is basic. In other embodiments, second solution 16 may not contain a basic neutralizing agent. In other embodiments, solution 16 may contain a polyol. In other embodiments, solution 16 may not contain a colouring agent. Variable speed agitators 18 are provided for operation in each of tanks 12 in this embodiment, to mix the components of solutions 14 and 16, respectively. Tank 12 containing solution 14 is equipped with immersion heater 20 to regulate the temperature of solution 14. In other embodiments, a heater may be provided in each tank, or more than one heater may be provided in a tank. Typical desirable temperatures for solution 14 are in the range of 25° C. to 100° C. In a preferred embodiment, solution 14 is heated to 60° C.; in another preferred embodiment, it is heated to 80° C. Solution 14 in tank 12 is heated to aid in the solubility of the polymeric water-soluble thickening agent. Solution 14 is then allowed to cool, to a range of 20° C. to 60° C., preferably 60° C. In another embodiment, solution 14 is not heated to solubilize the polymeric water-soluble thickening agent.

Intake conduits 24 extend from tanks 12 to main cylinder assemblies 26, and are equipped with manual flow valves 22 in order to regulate flow of solutions 14 and 16 from tanks 12. Upon activation of pneumatic actuator 28 to an upstroke mode, main cylinder pistons 30 which are engaged within main cylinder assemblies 26, to form pump assembly 27 are activated and, upon engagement of manual flow valves 22 to their open position, solutions 14 and 16 are transported to separate main cylinder assemblies, 26 by force of suction created by the upstroke motion of main cylinder pistons 30 in intake ports 31. Solutions 14 and 16 pass through intake check valves 32 of check valve assemblies 34 and fill main cylinder assemblies 26. Main cylinder pistons 30 stop at volumes pre-selected using a pneumatic logic control system and intake check valves 32 close. In one embodiment, each cylinder has a maximum volumetric capacity of 2 liters. In another embodiment, the volumetric capacity is greater. In other embodiments, the volumetric capacity is less. In the preferred embodiment, the plungers move simultaneously and at the same rate. In other embodiments, the plungers move separately and at different rates from each other. Pneumatic actuator 28 is next activated in the downstroke mode causing main cylinder pistons 30 to create pressure in the cylinder assemblies 26 and discharge ports 38. Solutions 14 and 16 are transported by way of pressure through discharge check valves 40 of check valve assemblies 34 to static mixer assembly 42 where the two solutions are forced together through mixer vanes 44 of static mixer assembly 42 as gelation occurs. Static mixer assembly 42, in this embodiment, can be variably positioned vertically and can pivotally left or right for ease or storage. The viscosity of aqueous surface treatment composition 46 increases resulting in an increase in backpressure on discharge check valves 40. Automatic discharge valve 48 opens and the aqueous surface treatment composition is dispensed into a receptacle 50 through dispensing head 45 of static mixer assembly 42 at a specific volume ultimately determined by the distance travelled by main cylinder pistons 30 which are controlled using the pneumatic logic control system. Discharge valve 48 engages to a closed position when the downstroke of pneumatic cylinder 76 (not shown in this schematic) is complete and pneumatic actuator 28 resets. Static mixer assembly 42 and dispensing head 45 are mounted on an adjustable positioning slide for ease of set-up.

Apparatus 10 in a preferred embodiment is composed of polypropylene with main cylinder assemblies 26 composed of acrylic. In another embodiment, apparatus 10 is composed of steel coated with electroless nickel, with main cylinder assemblies 26 composed of anodized aluminum tubing. In another embodiment, main cylinder assemblies 26 have anodized chamfered ends.

In the preferred embodiment, the apparatus is employed for intermittent production. In another embodiment, the apparatus can be employed for continuous production.

In the remaining figures, elements previously described have been given the same reference number.

Figure 2:
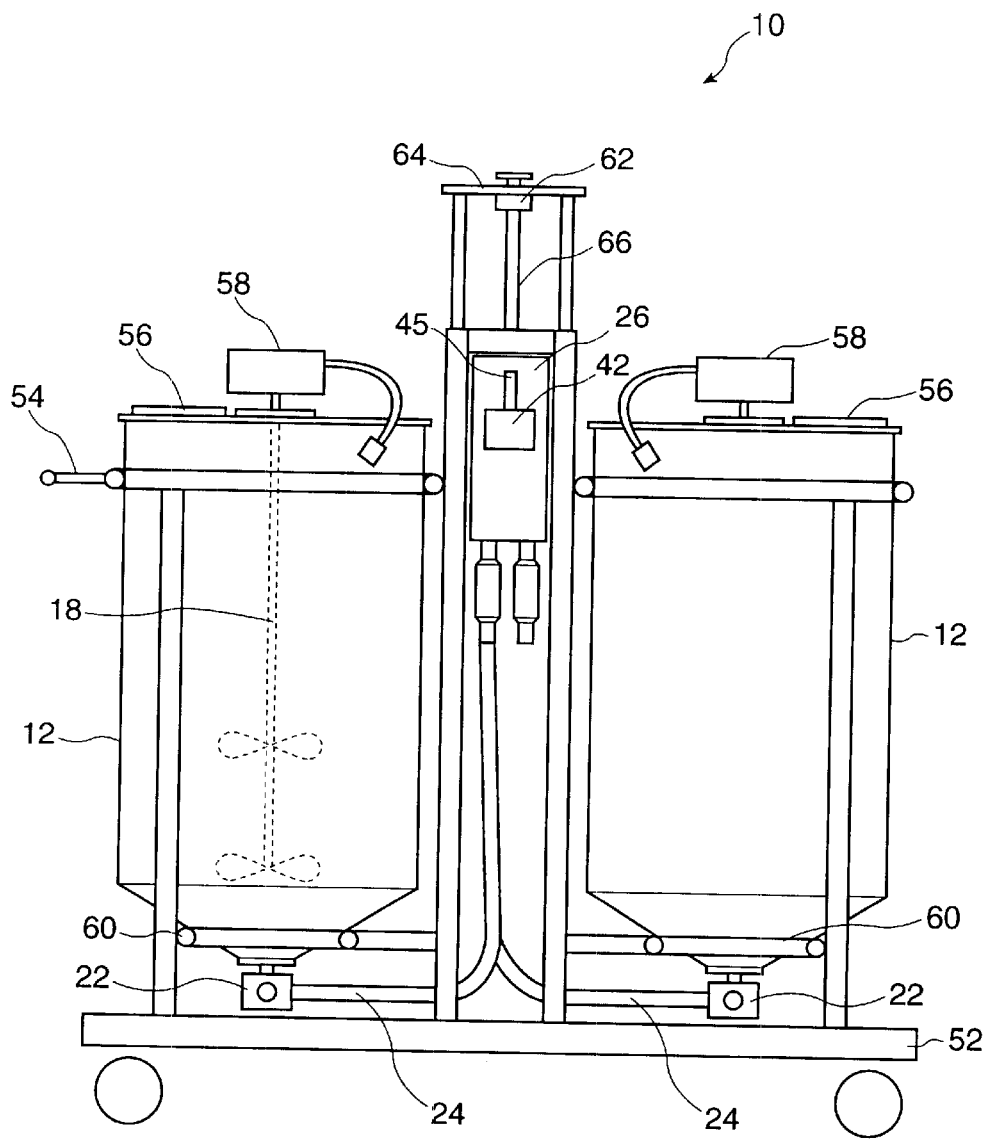
FIG. 2 is a front view of the apparatus of FIG. 1.

Referring now to FIG. 2, apparatus 10 is mounted on adjustable positioning slide 52 equipped with handle 54 for ease of movement and lower support rings ( ) are used to help position and secure tanks 12. Manual flow valves 22 are variable positioning and, in this embodiment, includes a position that allows for delivery of water, either by positive flushing force or via suction force, for cleaning of the apparatus, including pumping assembly 27. Tanks 12 include hatch covers 56 that can be in an open or closed position relative to tanks 12. In this embodiment, variable speed agitators 18 are controlled with air motors 58. Pump assembly 27 includes positive stop collar 62 mounted to drive bracket 64 which is attached to piston rod 66 to regulate the distance pistons 30 travel upward.

Figure 3:
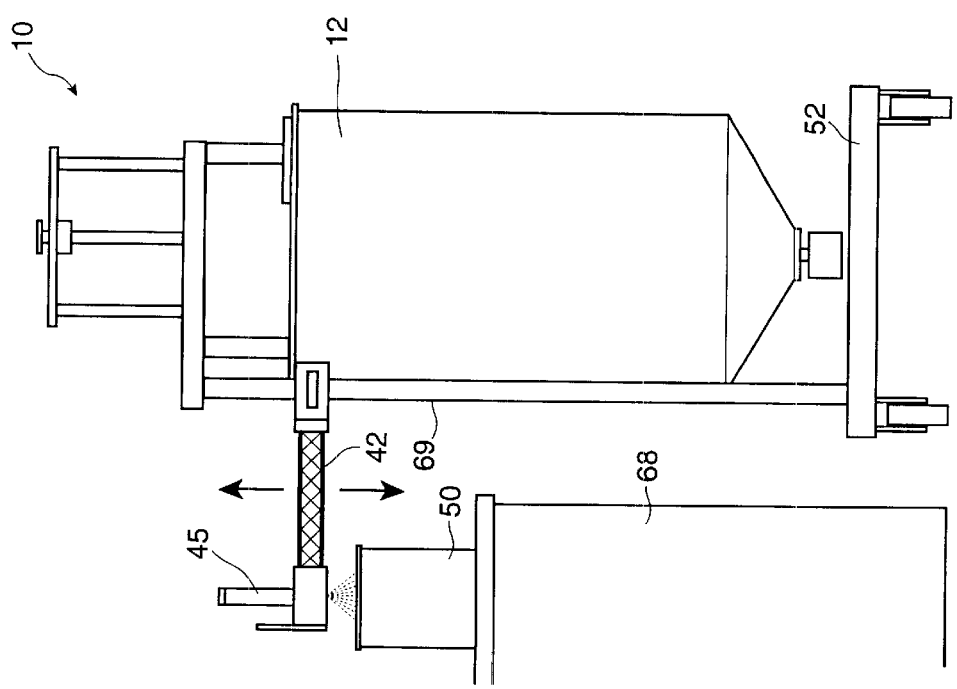
FIG. 3 is a side view of the apparatus of FIG. 1.

Referring now to FIG. 3, which is a side view of the apparatus of FIG. 1, there is shown adjustable bench 68 which positions receptacle 50 in position for receiving the final compositions from dispensing head 45 of static mixer assembly 42. Static mixer assembly 42 and dispensing head 45 can slide up and down on support rod 69 thus allowing for dispensing at variable heights.

Figure 4:
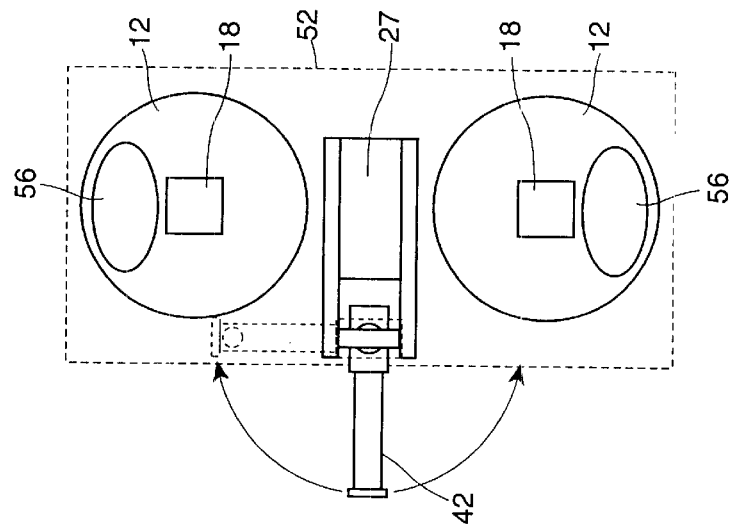
FIG. 4 is a top plan view of the apparatus of FIG. 1.

Referring now to FIG. 4, there is shown a top plan view of the apparatus of FIG. 1 with the variable positioning static mixer assembly 42.

Figure 6:
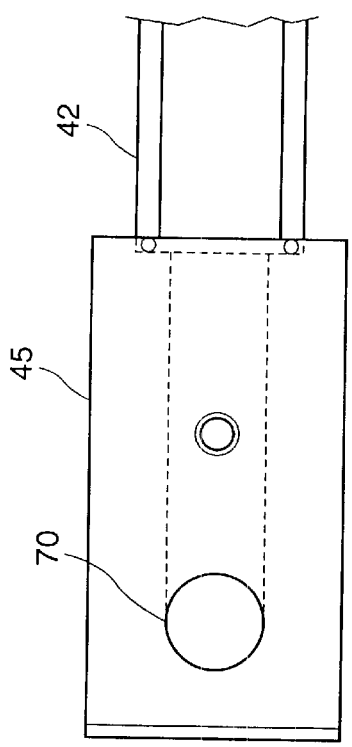
FIG. 6 is a top plan view of the dispensing head and static mixer assembly of the FIG. 1 embodiment.
Figure 5:
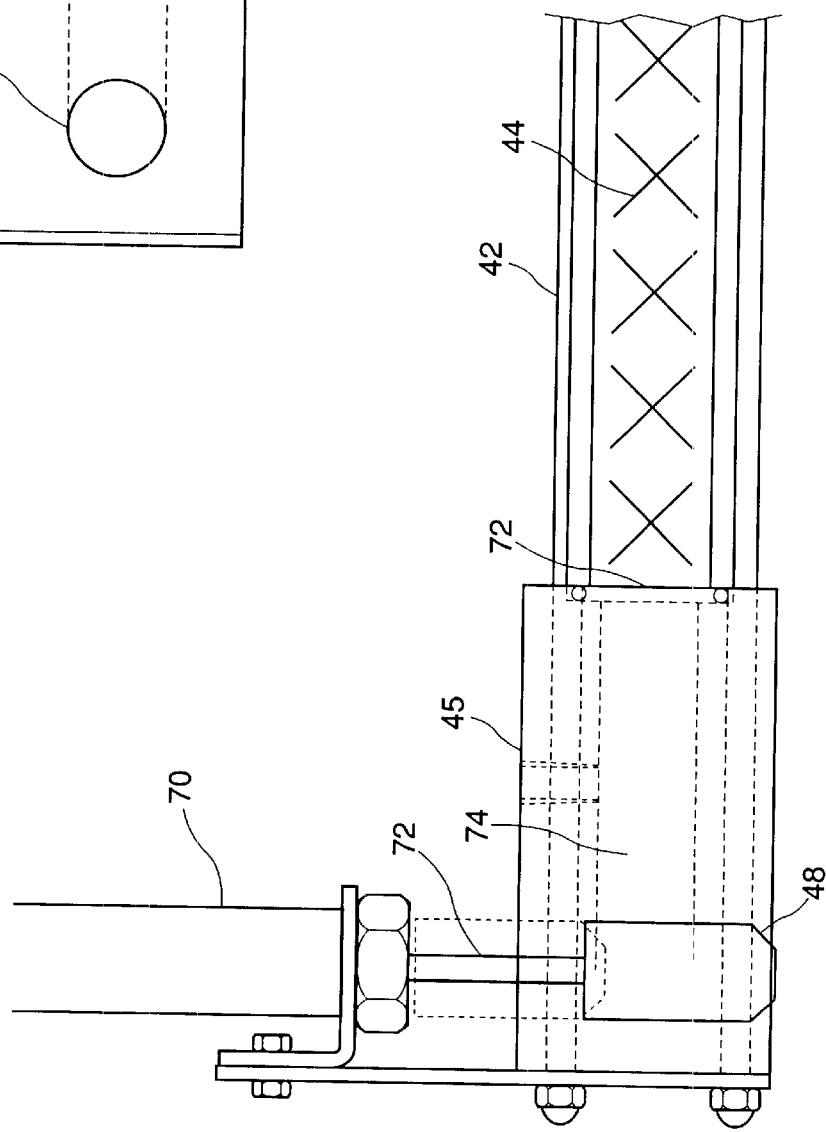
FIG. 5 is a side view of the dispensing head and static mixer assembly of the apparatus of FIG. 1.

Referring now to FIG. 5, FIG. 6, and FIG. 8, there is shown a detailed side view, and a top view of dispensing head 45 and static mixer assembly 42 of FIG. 1. Assembly 42 includes an internal mixer, in this embodiment, mixer vanes 44, valves 78 for passage of the first and second solution into the assembly, and passage 72 through which the mixed composition passes prior to entering central channel 74 of dispensing head 45. Pneumatic cylinder 70 forces the downward motion of plunger 72 which, in turn, activates opening of the Automatic discharge valve 48 through which the aqueous surface treatment composition passes into a receptacle. Discharge valve 48 engages to a closed position when the downstroke of pneumatic cylinder 70 is complete. In this embodiment, pneumatic cylinder is spring loaded.

Referring now to FIG. 7, there is shown a partial front view of pumping assembly 27 of FIG. 1, showing the pneumatic actuator 28 and only one cylinder 26 and piston 30. Pumping assembly contains, in this embodiment, aft head flange 80, fore head flange 82 and piston seal 84.

EXAMPLES

The compositions are hereinafter described more specifically by way of examples. However, the present invention is not restricted to the examples.

Example I 0.5 gram of methylvinylether/maleic anhydride 1,9-decadiene crosspolymer (Stabileze™) was added to 99 g of deionized water at 80° C. with constant stirring and agitation for about 20 minutes. A translucent liquid developed which indicated that the crosslinked copolymer was hydrolysed (pH 2.5). The dispersion was cooled to 60° C. and then 0.5 g of sodium hydroxide was added. A homogeneous clear gel of the hydrolyzed, crosslinked copolymer was obtained within several minutes. The resulting clear gel has a product of pH 7. The gel was applied by brush to a wooden substrate forming a non-film forming surface treatment thereon.

Example II

Example I was repeated except that a different base, triethanolamine, was substituted for sodium hydroxide. The resulting clear gel has a product of pH 7. The gel was applied by brush to a wooden substrate forming a non-protective film-forming surface treatment thereon.

Example III

A first solution was prepares by addition of one gram of Stabileze™ to 99 g of deionized water at 80° C. with constant stirring and agitation for about 20 minutes. A translucent liquid developed which indicated that the dispersed, crosslinked copolymer was hydrolysed (approximately pH 2.5). The dispersion was cooled to 60° C. A second solution was prepared by addition of 1.0 gram of triethanolamine to 99.0 grams of water and mixed. The pH of the second solution was between 9.5 and 12. Fifty grams of the first solution and 50 grams of the second solution were added and a homogeneous clear gel of the hydrolysed, crosslinked copolymer was obtained almost instantaneously. The resulting clear gel has a product of pH 6.5–7.5. The surface treatment composition of example III by percent weight is given below:

| Component | Percent by weight (%) |
| --- | --- |
| Water | 99.0 |
| STABILEZE ™ | 0.50 |
| Triethanolamine | 0.5 |
| Total | 100.00 |

Example IV

Example III was repeated except that a different base, 0.2 g of sodium hydroxide is added to 99.8 g of water in the second solution. The surface treatment composition of example IV is given below:

| Component | Percent by weight (%) |
| --- | --- |
| Water | 99.0 |
| STABILEZE ™ | 0.50 |
| Sodium hydroxide | 0.10 |
| Total | 100.00 |

Example V

Example III was repeated except that the first solution comprised 99.1 g of water and 0.9 g of STABILEZE™, and in the second solution, 43.89 g of water was combined with 41.74 g of propylene glycol, followed by addition of 0.58 g of triethanolamine, then 9.72 g of Aquasperse™ brown, 4.86 g of Aquasperse™ red oxide, and 1.32 g of Aquasperse™ Black as colouring agents. The resulting wood stain surface treatment composition of the invention is given below:

| Component | Percent by weight (%) |
| --- | --- |
| Water | 71.49 |
| propylene glycol | 20.87 |
| Aquasperse ™ Brown | 4.86 |
| Aquasperse ™ red oxide | 1.36 |
| Aquasperse ™ Black | 0.68 |
| STABILEZE ™ | 0.45 |
| Triethanolamine | 0.29 |
| Total | 100.00 |

Upon combining all components, the resulting wood stain surface treatment composition was a thixotropic liquid with an overall pH of 7.0.

Example VI

Example III was repeated except that the first solution comprised 99.22 g of water and 0.78 g of STABILEZE™, and in the second solution, 22.57 g of water was combined with 58.76 g of propylene glycol, followed by addition of 0.3.11 g of triethanolamine, then 15.54 g of Aquasperse™ white a as colouring agent. The resulting colouring glaze surface treatment composition of the invention is given below:

| Component | Percent by weight (%) |
| --- | --- |
| Water | 67.78 |
| propylene glycol | 24.16 |
| Aquasperse ™ white | 6.39 |
| STABILEZE ™ | 0.39 |
| Triethanolamine | 1.28 |
| Total | 100.00 |

Upon combining all components, the resulting colouring glaze surface treatment composition was a semi-gel with an overall pH of 7.0.

Example VII

Example III was repeated except that the first solution comprised 99.0 g of water and 1.0 g of STABILEZE™, and in the second solution, 88.6 g of water was combined with 0.4 g of sodium hydroxide, then 1.0 g of Aquasperse™ blue and 10.0 g of pearl powder as colouring agents. The resulting faux finishing surface treatment composition of the invention is given below:

| Component | Percent by weight (%) |
| --- | --- |
| Water | 93.80 |
| pearl powder | 5.00 |
| Aquasperse ™ blue | 0.50 |
| STABILEZE ™ | 0.50 |
| Sodium hydroxide | 0.20 |
| Total | 100.00 |

Upon combining all components, the resulting faux finish surface treatment composition was a gel with an overall pH of 7.0.

Example VIII

Example III was repeated except that the first solution comprised 99 g of water and 1.0 g of STABILEZE™, and in the second solution, 99.6 g of water was combined with 0.4 g of sodium hydroxide. The resulting softwood conditioner surface treatment composition of the invention is given below:

| Component | Percent by weight (%) |
|---|---|
| Water | 99.30 |
| STABILEZE ™ | 0.50 |
| Sodium hydroxide | 0.20 |
| Total | 100.00 |

Upon combining all components, the resulting softwood conditioner composition was a gel with an overall pH of 7.0.

What is claimed is:

1. A surface treated with an aqueous surface treatment composition, comprising:
   a surface selected from the group consisting of wood, reconstituted wood, plastics, paper, cementatious substrates, previously primed substrates, and previously coated substrates; and
   an aqueous surface treatment coating composition applied to said surface, said aqueous surface treatment composition comprising:
   (a) a polymeric water soluble thickening agent comprising a crosslinked alkyl vinyl ether/maleic anhydride copolymer;
   (b) water;
   (c) one or more than one basic neutralizing agent; and
   (d) one or more than one coloring agent,
   wherein said composition is prepared, in part, by hydrolysis of said anhydride groups of said crosslinked alkyl vinyl ether/maleic anhydride copolymer to their corresponding carboxylic acid groups, followed by neutralizing of said carboxylic acid groups with said basic neutralizing agent(s), and the composition is non-film forming upon application to a surface.

2. A surface created with an aqueous surface treatment composition, comprising:
   a surface selected from the group consisting of wood, reconstituted wood, plastics, paper, cementatious substrates, previously primed substrates, and previously coated substrates; and
   an aqueous surface treatment composition applied to said surface, said aqueous surface treatment composition comprising:
   (a) a polymeric water soluble thickening agent comprising a crosslinked methyl vinyl ether/maleic anhydride copolymer, the agent being between 1 and about 5% crosslinked with 1,9-decadiene;
   (b) water;
   (c) one or more than one basic neutralizing agent; and
   (d) one or more than one coloring agent,
   wherein said surface treatment composition is non-film forming upon application to a surface.

3. A surface treated with an aqueous surface treatment composition, comprising:
   a surface selected from the group consisting of wood, reconstituted wood, plastics, paper, cementatious substrates, previously primed substrates, and previously coated substrates, and
   an aqueous surface treatment composition comprising;
   (a) a polymeric water soluble thickening agent;
   (b) water;
   (c) one or more than one basic neutralizing agent; and
   (d) one or more than one coloring agent,
   wherein said surface treatment composition is non-film forming upon application to said surface.

4. A surface treated with an aqueous surface treatment composition, comprising:
   a surface selected from the group consisting of wood, reconstituted wood, plastics, paper, cementatious substrates, previously primed substrates, and previously coated substrates, and
   an aqueous surface treatment composition comprising:
   (a) a polymeric water soluble thickening agent;
   (b) water;
   (c) one or more than one basic neutralizing agent; and
   (d) one or more than one polyol,
   wherein the composition comprises up to 50% by weight of said one or more than one polyol such that, upon application of said surface treatment composition to said surface, said surface treatment composition possesses a re-wettable edge.

5. The aqueous surface treatment composition of claim 3 wherein said polymeric water soluble thickening agent has a Tg greater than 30° C.

6. The aqueous surface treatment coating composition of claim 3 wherein the polymeric water-soluble thickening agent comprises a crosslinked alkyl vinyl ether/maleic anhydride copolymer.

7. The aqueous surface treatment coating composition of claim 6 wherein said alkyl vinyl ether is methyl vinyl ether.

8. The aqueous surface treatment coating composition of claim 3 wherein said basic neutralizing agent(s) is selected from a group consisting of alkanolamines, inorganic hydroxides, organic hydroxides, and amines.

9. The aqueous surface treatment composition of claim 3 wherein said surface treatment composition is film forming upon application to a surface.

10. The aqueous surface treatment composition of claim 4 wherein said polyol comprises propylene glycol.

11. The aqueous surface treatment composition of claim 3 wherein said coloring agent is selected from a group consisting of inorganic dyes, organic dyes, synthetic pearls, synthetic metallics, organic and inorganic pigments, tintants and colorants.

12. An aqueous surface treatment composition comprising:
   (a) 0.1 wt % to 1 wt. % of a crosslinked alkyl vinyl ether/maleic anhydride copolymers;
   (b) 0.0 wt % to 12 wt. % of one or more than one colorants;
   (c) 0.0 wt % to 50 wt % of one or more than one polyol;
   (d) 0.2 wt % to 2% of one or more than one basic neutralizing agents; and
   (e) 50 wt % to 99.8 wt % water;
   wherein percentages of components of said composition are selected in such a way that the pH of the surface treatment composition is between about 6 and about 8.

13. The aqueous surface treatment composition of claim 4 wherein said polymeric water soluble thickening agent has a greater than 30° C.

14. The aqueous surface treatment coating composition claim 4 wherein the polymeric water-soluble thickening agent comprises a crosslinked alkyl vinyl ether/maleic anhydride polymer.

15. The aqueous surface treatment coating composition claim 4 wherein said basic neutralizing agent(s) is selected from a group consisting of alkanolamines, inorganic hydroxides, organic hydroxides, and amines.

16. The aqueous surface treatment composition of claim 4 wherein said surface treatment composition is non-film forming upon application to a surface.

17. The aqueous surface treatment coating composition of claim 14 wherein said alkyl vinyl ether is methyl vinyl ether.

18. The aqueous surface treatment coating composition of claim 14 wherein said composition is prepared, in part, by hydrolysis of said anhydride groups of said crosslinked alkyl vinyl ether/maleic anhydride copolymer to their corresponding carboxylic acid groups, followed by neutralization of said carboxylic acid groups with said basic neutralizing agent(s).

19. The aqueous surface treatment coating composition of claim 15 wherein said basic neutralizing agent(s) is present at a weight percent sufficient to raise the pH of said composition to about pH 7.

20. The aqueous surface treatment coating composition of claim 17 wherein said agent is between 1 and about 5% crosslinked.

21. The aqueous surface treatment coating composition of claim 20 wherein said agent is crosslinked with 1,9-decadiene.

22. The aqueous surface treatment composition of claim 21 wherein said polymeric water soluble thickening agent is present at from 0.1 wt % to 1 wt % of the total composition.

23. The aqueous surface treatment composition of claim 16 wherein said basic neutralizing agent comprises triethanolamine.

24. The aqueous surface treatment composition of claim 1 wherein said basic neutralizing agent comprises sodium hydroxide.

25. The aqueous surface treatment coating composition of claim 8 wherein said basic neutralizing agent(s) is present at a weight percent sufficient to raise the pH of said composition to about pH 7.

26. The aqueous surface treatment coating composition of claim 4 wherein said polyol(s) is selected from a group consisting of alkylene glycols, aromatic polyols, alkyl polyols, aliphatic polyether diols, linear or branched poly(oxybutylene) glycols, and mixed polyether diols.

27. The polymeric water soluble thickening agent of claim 7 wherein said agent is between 1 and about 5% crosslinked.

28. The aqueous surface treatment composition of claim 2 wherein said polymeric water soluble thickening agent is present at from 0.1 wt % to 1 wt % of the total composition.

29. The aqueous surface treatment composition of claim 9 wherein said basic neutralizing agent comprises triethanolamine.

30. The aqueous surface treatment composition of claim 9 wherein said basic neutralizing agent comprises sodium hydroxide.

31. The aqueous surface treatment coating composition of claim 6 wherein said composition is prepared, in part, by hydrolysis of said anhydride groups of said crosslinked alkyl vinyl ether/maleic anhydride copolymer to their corresponding carboxylic acid groups, followed by neutralization of said carboxylic acid groups with said basic neutralizing agent(s).

32. The polymeric water soluble thickening agent of claim 27 wherein said agent is crosslinked with 1,9-decadiene.

33. The aqueous surface treatment composition of claim 2 wherein said polymeric water soluble thickening agent is present at from 0.1 wt % to 1 wt % of the total composition.

* * * * *